United States Patent
Pellizzari et al.

(10) Patent No.: US 7,177,535 B2
(45) Date of Patent: Feb. 13, 2007

(54) APPARATUS FOR GENERATING POWER AND HYBRID FUEL VAPORIZATION SYSTEM

(75) Inventors: Roberto O. Pellizzari, Groton, MA (US); Peter Loftus, Cambridge, MA (US); James Moran, Somerville, MA (US)

(73) Assignee: Philip Morris USA Inc., Richmond, VA (US)

( * ) Notice: Subject to any disclaimer, the term of this patent is extended or adjusted under 35 U.S.C. 154(b) by 183 days.

(21) Appl. No.: 10/883,394

(22) Filed: Jul. 1, 2004

(65) Prior Publication Data

US 2005/0028793 A1 Feb. 10, 2005

Related U.S. Application Data

(60) Provisional application No. 60/484,530, filed on Jul. 1, 2003.

(51) Int. Cl.
 *F24H 1/10* (2006.01)
(52) U.S. Cl. .................................. 392/478; 392/465
(58) Field of Classification Search .................. None
 See application file for complete search history.

(56) References Cited

U.S. PATENT DOCUMENTS

| | | | |
|---|---|---|---|
| 3,716,416 A | 2/1973 | Adlhart et al. | 136/86 B |
| 3,868,939 A | 3/1975 | Friese et al. | 123/179 L |
| 4,013,396 A | 3/1977 | Tenney | 431/11 |
| 4,193,755 A | 3/1980 | Guarnaschelli et al. | 431/207 |
| 4,320,180 A | 3/1982 | Nozaki | 429/20 |
| 4,344,404 A | 8/1982 | Child et al. | 123/538 |
| 4,375,799 A | 3/1983 | Swanson | 123/549 |
| 4,384,457 A | 5/1983 | Harvey | 60/524 |
| 4,545,356 A | 10/1985 | Casey | 123/527 |

(Continued)

FOREIGN PATENT DOCUMENTS

DE 37 16 411 5/1983

(Continued)

OTHER PUBLICATIONS

Patent Abstracts of Japan vol. 1997, No. 10, (Oct. 31, 1997) & JP 09 158731 A (Isuzu Ceramics Kenkyusho:KK), (Jun. 17, 1997) abstract: figures.

*Primary Examiner*—Thor S. Campbell
(74) *Attorney, Agent, or Firm*—Roberts, Mlotkowski & Hobbes

(57) ABSTRACT

A hybrid fuel vaporization system and an apparatus for producing power from a source of liquid fuel. The hybrid fuel vaporizing system includes at least one capillary flow passage, the at least one capillary flow passage having an inlet end and an outlet end, the inlet end in fluid communication with the source of liquid fuel; a heat source arranged along said at least one capillary flow passage, the heat source operable to heat the liquid fuel in the at least one capillary flow passage to a level sufficient to change at least a portion thereof from a liquid state to a vapor state; and a vaporizing member having a first surface and a second surface, the first surface exposed to heat produced by the apparatus for combusting fuel, the vaporizing member positioned so that fuel exiting the outlet end of said at least one capillary flow passage impinges on the second surface, whereby a stream of substantially vaporized fuel is delivered for combustion.

70 Claims, 9 Drawing Sheets

U.S. PATENT DOCUMENTS

| | | |
|---|---|---|
| 4,634,481 A | 1/1987 | Petersen et al. |
| 4,638,172 A | 1/1987 | Williams ................... 290/1 R |
| 4,665,881 A | 5/1987 | Wade ......................... 123/557 |
| 4,684,341 A * | 8/1987 | Kawamura et al. ......... 431/242 |
| 4,715,997 A | 12/1987 | Boone ......................... 261/142 |
| 4,784,599 A | 11/1988 | Garbo ............................ 431/7 |
| 4,821,516 A | 4/1989 | Isshiki ........................... 60/517 |
| 4,931,011 A | 6/1990 | Reiser et al. |
| 5,040,497 A | 8/1991 | Dingle ........................ 123/179 |
| 5,090,896 A | 2/1992 | Kenner et al. |
| 5,127,822 A | 7/1992 | Nakayama et al. ............ 431/10 |
| 5,472,645 A | 12/1995 | Rock et al. ................. 261/79.1 |
| 5,512,109 A | 4/1996 | Fraas et al. ................... 136/253 |
| 5,524,582 A | 6/1996 | Suh et al. ................... 123/179.8 |
| 5,563,365 A | 10/1996 | Dineen ........................ 102/431 |
| 5,723,050 A | 3/1998 | Unger et al. ................ 210/772 |
| 5,793,119 A | 8/1998 | Zinke ............................ 290/2 |
| 5,836,150 A | 11/1998 | Garcia ......................... 60/256 |
| 5,873,354 A | 2/1999 | Krohn et al. ................ 123/549 |
| 5,874,798 A | 2/1999 | Wiegele et al. ............. 310/168 |
| 5,917,144 A | 6/1999 | Miyake et al. ............... 136/205 |
| 5,932,940 A | 8/1999 | Epstein et al. ........ 310/40 MM |
| 6,092,912 A | 7/2000 | Nelson ........................ 362/253 |
| 6,095,436 A | 8/2000 | Seegers et al. .............. 239/403 |
| 6,102,687 A | 8/2000 | Butcher et al. .............. 431/115 |
| 6,109,222 A | 8/2000 | Glezer et al. .............. 123/46 R |
| 6,172,427 B1 | 1/2001 | Shinohara et al. ........ 290/40 B |
| 6,189,803 B1 | 2/2001 | Ganan ............................ 239/5 |
| 6,198,038 B1 | 3/2001 | Shukla et al. ............... 136/253 |
| 6,204,442 B1 | 3/2001 | Laqua ......................... 136/253 |
| 6,234,167 B1 | 5/2001 | Cox et al. ............... 128/200.14 |
| 6,276,347 B1 | 8/2001 | Hunt .......................... 123/549 |
| 6,390,076 B2 | 5/2002 | Hunt .......................... 123/549 |
| 2001/0020469 A1 | 9/2001 | Hunt .......................... 123/549 |
| 2005/0126624 A1* | 6/2005 | Pellizzari .................... 136/253 |

FOREIGN PATENT DOCUMENTS

| | | |
|---|---|---|
| DE | 33 18 863 | 12/1984 |
| EP | 0 905 447 | 3/1999 |
| WO | WO 01/21319 | 3/2001 |

\* cited by examiner

APPARATUS FOR GENERATING POWER AND HYBRID FUEL VAPORIZATION SYSTEM

RELATED APPLICATIONS

This patent application claims priority from Provisional Application Ser. No. 60/484,530, filed on Jul. 1, 2003, the contents of which are hereby incorporated by reference.

FIELD

The present invention relates to a power producing apparatus and fuel vaporization system therefor.

BACKGROUND

The need to power portable electronics equipment, communications gear, medical devices and other equipment in remote field service has been on the rise in recent years, increasing the demand for highly efficient, mobile power systems. These applications require power sources that provide both high power and energy density, while also requiring minimal size and weight, low emissions and cost.

To date, batteries have been the principal means for supplying portable sources of power. However, due to their size and weight, as well as the time required for recharging, batteries have proven inconvenient for continuous use applications. Moreover, portable batteries are generally limited to power production in the range of several milliwatts to a few watts and thus cannot address the need for significant levels of mobile, lightweight power production.

Small generators powered by internal combustion engines, whether gasoline- or diesel-fueled have also been used. However, the noise and emission characteristics of such generators have made them wholly unsuitable for a wide range of mobile power systems and unsafe for indoor use. While conventional heat engines powered by high energy density liquid fuels offer advantages with respect to size, thermodynamic scaling and cost considerations have tended to favor their use in larger power plants.

In view of these factors, a void exists with regard to power systems in the size range of approximately 50 to 500 watts. Moreover, in order to take advantage of high energy density liquid fuels, improved fuel preparation and delivery systems capable of low fueling rates are needed. Additionally, such systems must also enable highly efficient combustion with minimal emissions.

A combustion device wherein fuel is atomized by an ultrasonic atomizing device is proposed in U.S. Pat. No. 5,127,822. According to this patent, atomizers have been proposed wherein fuel is supplied to a combustion chamber in fine droplets to accelerate vaporization of the fuel and reduce the combustor residence time required to achieve acceptable combustion efficiency.

U.S. Pat. No. 5,127,822 proposes an arrangement wherein fuel is supplied at 5 cc/min and the fuel is atomized into droplets having a Sauter Mean Diameter (SMD) of 40 µm. Other atomizing techniques are proposed in U.S. Pat. Nos. 6,095,436 and 6,102,687. An ultrasonic atomizer for supplying fuel to an internal combustion engine is proposed in U.S. Pat. No. 4,986,248.

U.S. Pat. No. 4,013,396 proposes a fuel aerosolization apparatus wherein a hydrocarbon fuel (e.g., gasoline, fuel oil, kerosene, etc.) is dispensed into a condensation area with the intention of forming an aerosolized fuel of relatively even sized droplets less than 1 µm in diameter.

A fuel-vaporizing device said to address problems associated with incomplete combustion of fuel aerosols in internal combustion engines is proposed in U.S. Pat. No. 5,472,645. According to U.S. Pat. No. 5,472,645, because aerosol fuel droplets do not ignite and combust completely in internal combustion engines, unburned fuel residues are exhausted from the engine as pollutants such as hydrocarbons (HC), carbon monoxide (CO) and aldehydes with concomitant production of oxides of nitrogen ($NO_x$). The proposal of U.S. Pat. No. 5,472,645 is intended to improve combustion of aerosol fuels by breaking liquid fuel down into an air-fluid stream of vaporized or gas-phase elements containing some unvaporized aerosols containing hydrocarbons of higher molecular weight, the lighter fuel distillates said to quickly evaporate to the gas phase, mix with air and are to be fed to an internal combustion engine while the heavier fuel portions are said to be transformed into a gas-phase vaporized state before they exit a cyclone vortex device and enter the intake manifold of the engine.

U.S. Pat. No. 4,344,404 proposes an apparatus for supplying aerosol fuel droplets mixed with air to an internal combustion engine or burner, the fuel droplets said to have sizes of 0.5 to 1.5 µm. The liquid fuel in aerosol form is intended to be mixed with air in a air-to-fuel ratio of about 18:1 to produce the least CO, HC and $NO_x$ emissions from the engine.

Various devices have been proposed for heating fuels into a vaporized fuel that is combusted by a burner. See, for example, U.S. Pat. Nos. 4,193,755; 4,320,180; and 4,784,599.

U.S. Pat. No. 3,716,416 discloses a fuel-metering device intended for use in a fuel cell system. The fuel cell system is intended to be self-regulating, producing power at a predetermined level. The proposed fuel metering system includes a capillary flow control device for throttling the fuel flow in response to the power output of the fuel cell, rather than to provide improved fuel preparation for subsequent combustion. Instead, the fuel is intended to be fed to a fuel reformer for conversion to $H_2$ and then fed to a fuel cell. In a preferred embodiment, the capillary tubes are made of metal and the capillary itself is used as a resistor, which is in electrical contact with the power output of the fuel cell. Because the flow resistance of a vapor is greater than that of a liquid, the flow is throttled as the power output increases. The fuels suggested for use include any fluid that is easily transformed from a liquid to a vapor phase by applying heat and flows freely through a capillary. Vaporization appears to be achieved in the manner that vapor lock occurs in automotive engines.

U.S. Pat. No. 6,276,347 proposes a supercritical or near-supercritical atomizer and method for achieving atomization or vaporization of a liquid. The supercritical atomizer of U.S. Pat. No. 6,276,347 is said to enable the use of heavy fuels to fire small, light weight, low compression ratio, spark-ignition piston engines that typically burn gasoline. The atomizer is intended to create a spray of fine droplets from liquid, or liquid-like fuels, by moving the fuels toward their supercritical temperature and releasing the fuels into a region of lower pressure on the gas stability field in the phase diagram associated with the fuels, causing a fine atomization or vaporization of the fuel. Utility is disclosed for applications such as combustion engines, scientific equipment, chemical processing, waste disposal control, cleaning, etching, insect control, surface modification, humidification and vaporization.

To minimize decomposition, U.S. Pat. Nos. 6,276,347 and 6,390,076 each propose keeping the fuel below the supercritical temperature until passing the distal end of a restrictor for atomization. For certain applications, heating just the tip of the restrictor is desired to minimize the potential for chemical reactions or precipitations. This is said to reduce problems associated with impurities, reactants or materials in the fuel stream which otherwise tend to be driven out of solution, clogging lines and filters. Working at or near supercritical pressure suggests that the fuel supply system operate in the range of 300 to 800 psig. While the use of supercritical pressures and temperatures might reduce clogging of the atomizer, it appears to require the use of a relatively more expensive fuel pump, as well as fuel lines, fittings and the like that are capable of operating at these elevated pressures.

Power conversion arrangements are proposed in U.S. Pat. Nos. 4,638,172; 5,836,150; 5,874,798; 5,932,940; 6,109,222; and 6,198,038. Of these, U.S. Pat. No. 4,638,172 proposes a direct current generator operatively coupled to a small internal combustion engine, the generator said to output between 4 volts (V) and 150 milliamperes (mA) to 110 V and over 250 mA. U.S. Pat. No. 5,836,150 proposes a micro thrust and heat generator that can be used as a thrust source for a micro machined turbo-electric generator. U.S. Pat. No. 5,874,798 proposes a micro-turbine generator device wherein air is fed into the device to generate electricity for use with portable electronic products. U.S. Pat. No. 5,932,940 proposes a micro-gas turbine engine including a combustion chamber used to drive a microgenerator which is intended to output 10 to 30 watts of electrical power for replacement of batteries in portable electronic devices while producing 20 times the power for the same weight and volume (e.g., replacing batteries for portable computers, radios, telephones, power tools, heaters, coolers, military applications, etc.). U.S. Pat. No. 6,109,222 patent proposes a micro heat engine that is intended to generate 10 to 30 watts of electrical power wherein a free piston is reciprocated by a periodic combustion process.

SUMMARY

The present invention provides a hybrid fuel vaporizing system for use in an apparatus for producing power from a source of liquid fuel. The hybrid fuel vaporizing system includes at least one capillary flow passage, the at least one capillary flow passage having an inlet end and an outlet end, the inlet end in fluid communication with the source of liquid fuel, a heat source arranged along the at least one capillary flow passage, the heat source operable to heat the liquid fuel in the at least one capillary flow passage to a level sufficient to change at least a portion thereof from a liquid state to a vapor state and a vaporizing member having a first surface and a second surface, the first surface exposed to heat produced by the apparatus for combusting fuel, the vaporizing member positioned so that fuel exiting the outlet end of said at least one capillary flow passage impinges on the second surface, whereby a stream of substantially vaporized fuel is delivered for combustion.

The present invention also provides an apparatus for producing power from a source of liquid fuel. The apparatus includes at least one capillary flow passage, the at least one capillary flow passage having an inlet end and an outlet end, the inlet end in fluid communication with the source of liquid fuel, a heat source arranged along the at least one capillary flow passage, the heat source operable to heat the liquid fuel in the at least one capillary flow passage to a level sufficient to change at least a portion thereof from a liquid state to a vapor state, a vaporizing member having a first surface and a second surface, the first surface exposed to heat produced by the apparatus for combusting fuel, the vaporizing member positioned so that fuel exiting the outlet end of said at least one capillary flow passage impinges on the second surface, whereby a stream of substantially vaporized fuel is delivered for combustion.

Also provided is a method of generating power. The method includes the steps of supplying liquid fuel to at least one capillary flow passage, the at least one capillary flow passage positioned so that fuel exiting the at least one capillary flow passage impinges on a vaporizing member having a first surface and a second surface, heating the fuel that impinges on the vaporizing member and causing a stream of substantially vaporized fuel to be formed, combusting the vaporized fuel in a combustion chamber, and converting heat produced by combustion of the vaporized fuel in the combustion chamber into mechanical and/or electrical power using a conversion device, wherein the first surface of the vaporizing member is positioned proximate to the combustion chamber so that heat produced from combustion is effective to heat the fuel that impinges on the second surface of the vaporizing member and supply the stream of substantially vaporized fuel for combustion.

In one aspect, a power generator having a fuel preparation system with the ability to form small fuel droplets and/or vapor, operate at low fuel supply pressures, have low parasitic power loss characteristics and provide for the control of fouling, clogging and gumming, is provided.

In another aspect, the capillary flow passage can include a capillary tube and the heat source can include a resistance-heating element, a section of the tube heated by passing electrical current therethrough.

Further, in another aspect, the conversion device includes a micro-turbine, a micro-turbine with electrical generator, an external combustion engine, such as a Stirling engine, an external combustion engine, such as a Stirling engine, with electrical generator, a thermoelectric device or a thermo-photovoltaic device.

In another aspect, a heat exchanger is provided which includes an exhaust duct through which exhaust gases removed from the combustion chamber are circulated and an air passage through which air is circulated, the heat exchanger preheating the air in the air passage by transferring heat from the exhaust gases in the exhaust duct to the air. This aspect can also include an air blower, the air blower supplying air under pressure to the combustion chamber such that the pressurized air mixes with the vaporized fuel in a desired air-fuel ratio suitable for combustion of the air-fuel mixture.

To address problems associated with the formation of deposits during the heating of liquid fuel, another aspect provides means for cleaning deposits formed during operation.

BRIEF DESCRIPTION OF THE DRAWINGS

The invention will now be described in more detail with reference to preferred forms of the invention, given only by way of example, and with reference to the accompanying drawings, in which:

FIG. 1 presents a hybrid fuel-vaporizing device, in partial cross section, which includes a capillary flow passage and a vaporizing chamber in accordance with an embodiment of the invention;

FIG. 2 shows a hybrid fuel-vaporizing device having a multi-capillary arrangement and a vaporizing chamber that can be used to implement the device and system of FIG. 4;

FIG. 3 shows a sectional view of the device shown in FIG. 2, taken along line 3—3;

DETAILED DESCRIPTION

Figure 1:
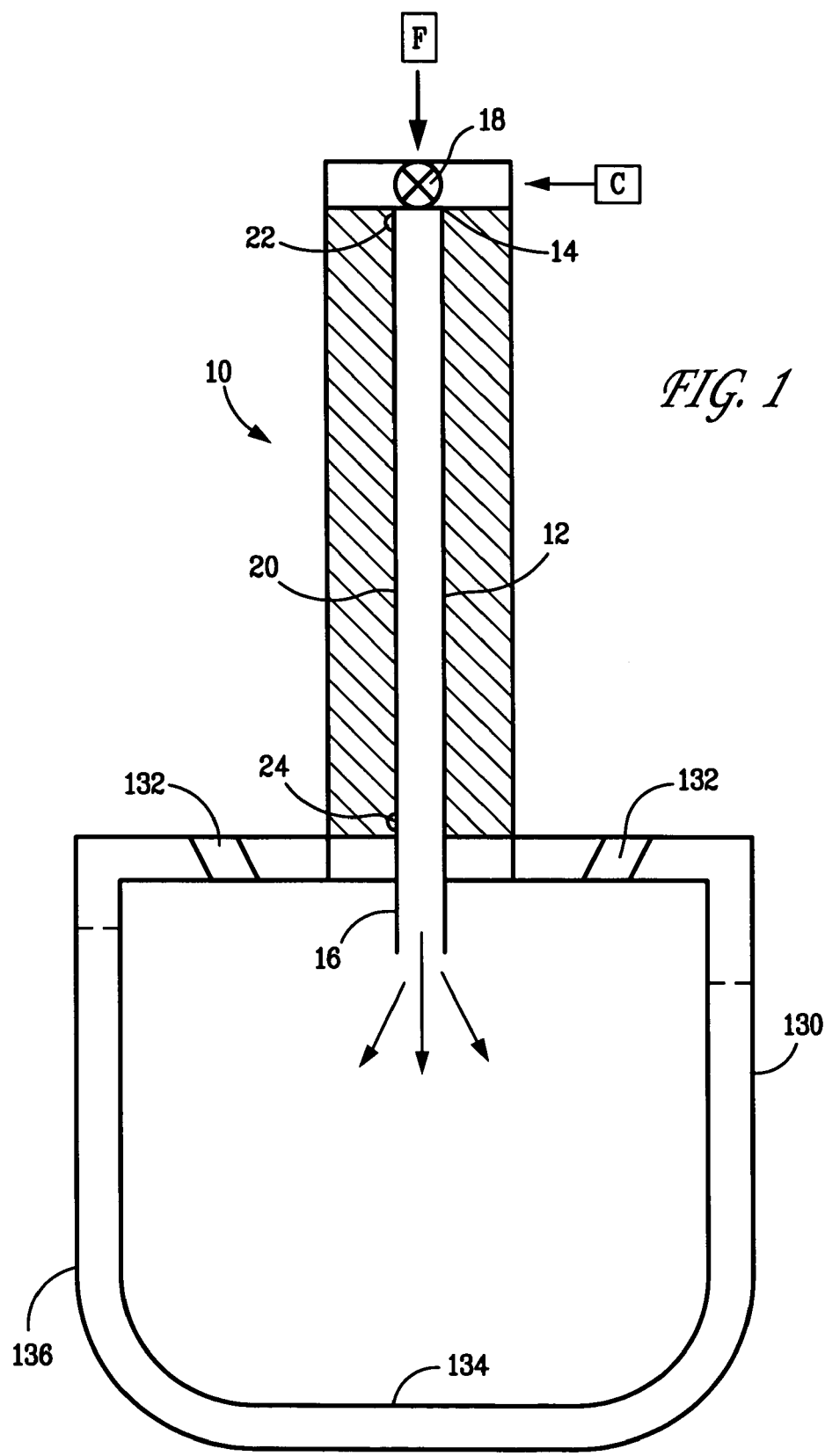

Reference is now made to the embodiments illustrated in FIGS. 1–10 wherein like numerals are used to designate like parts throughout.

The present invention provides a power producing apparatus and fuel system therefor which advantageously combusts a high energy density liquid fuel. The apparatus includes at least one capillary sized flow passage connected to a fuel supply, a heat source arranged along the flow passage to heat liquid fuel in the flow passage sufficiently to deliver a stream of vaporized fuel from the outlet of the capillary flow passage, a fuel vaporizing chamber in fluid communication with the outlet of the fuel passage to supply and vaporize liquid fuel for combustion, a combustion chamber in which the vaporized fuel is combusted, and a conversion device which converts heat produced by combustion in the combustion chamber into mechanical and/or electrical power.

Advantageously, the capillary flow passage may be heated initially at start up to vaporize the fuel and the vaporized fuel may subsequently be combusted to produce a flame. The vaporizing chamber is preferably located in the region of the flame so as to provide rapid heating and to cause any liquid fuel that enters it to be vaporized. Shortly after start up, the electrical power to the capillary flow passage may be gradually reduced such that the fuel supplied to the conventional vaporizer is a substantially preheated liquid. The fuel exits the vaporizing chamber and enters the combustion air stream through orifice holes, located and configured to promote good fuel and air mixing for combustion. The fuel flow rate through the hybrid capillary fuel vaporization system may be controlled through the use of a variable speed, constant displacement pump or, alternatively, the electrical power supplied to the capillary flow passage may be modulated and controlled to vary its pressure drop/flow characteristics, as necessary. For a fixed fuel supply pressure, applying heat to the capillary flow passage causes a reduction in fuel flow rate while simultaneously assisting with fuel vaporization.

It has been observed in the operation of continuously heated capillary flow passages employing electrical heating that fuel flow rate versus pressure drop performance degrades as carbon deposits form and occlude the capillary flow passage. Additionally, electrical power must be constantly supplied to the capillary, limiting the overall efficiency of the apparatus.

During start-up, the electrically heated capillary flow passage is used to provide fuel vapor for ignition. The capillary flow passage injects vaporized fuel directly into the vaporizing chamber. Owing to its preferred proximity to the combustion chamber, the temperature of the vaporizing chamber elevates, enabling the electric power supplied to the capillary passage to be reduced and eventually even eliminated. Liquid fuel then flows directly into the vaporizing chamber, which by this time is sufficiently hot enough to function. During steady state operation, the high liquid flow rate through the capillary helps to keep the liquid temperatures low to minimize clogging. The high liquid flow rate through the capillary also serves as a solvent to remove deposits formed during start up. Both these effects help prevent the capillary from clogging. As is preferred, the flow orifices of the vaporizing chamber are much larger relative to the capillary flow passage and thus are less vulnerable to clogging.

During steady state operation, the thermal energy required for vaporization is obtained from the combustion system directly. When employed in stand-alone power systems, extracting thermal energy directly from the combustion system is much more efficient than generating electricity to power a resistance heater.

The fuel flow rate through the hybrid fuel vaporizer may be controlled by several means. The fuel supply pressure may be regulated so as to vary flow as desired and/or in automatic response to variations in system pressure losses that result from variations in the fuel vaporization rate and location of fuel vaporization within the hybrid fuel vaporizer. The electrical power supplied to the resistance-heated capillary may also be varied to regulate flow in recognition that the pressure loss characteristics of the capillary flow passage may be regulated over a broad range by controlling the liquid preheating/vaporization/vapor superheating process. Alternatively, the fuel flow rate may be controlled through the use of a speed regulated, positive displacement pump.

As indicated, the capillary flow passage can be a capillary tube heated by a resistance heater, a section of the tube heated by passing electrical current therethrough. The capillary flow passage also is characterized by having a low thermal inertia, so that the capillary passageway can be brought up to the desired temperature for vaporizing fuel very quickly, e.g., within 2.0 seconds, preferably within 0.5 second, and more preferably within 0.1 second. The capillary sized fluid passage is preferably formed in a capillary body such as a single or multilayer metal, ceramic or glass body. The passage has an enclosed volume opening to an inlet and an outlet. The heater can be formed by a portion of the body such as a section of a stainless steel tube or the heater can be a discrete layer or wire of resistance heating material incorporated in or on the capillary body.

The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage.

A capillary-sized flow passage can be provided with a hydraulic diameter that is preferably less than 2 mm, more preferably less than 1 mm, and most preferably less than 0.5 mm. The "hydraulic diameter" is a parameter used in calculating fluid flow characteristics through a fluid carrying element and is defined as four times the flow area of the fluid-carrying element divided by the perimeter of the solid boundary in contact with the fluid (generally referred to as the "wetted" perimeter). For a tube having a circular flow passage the hydraulic diameter and the actual diameter are equivalent. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage that can be $8 \times 10^{-5}$ to 7 mm$^2$, preferably $8 \times 10^{-3}$ to $8 \times 10^{-1}$ mm$^2$ and more preferably $2 \times 10^{-3}$ to $2 \times 10^{-1}$ mm$^2$. Many combinations of a single or multiple capillaries, various pressures, various capillary lengths, amounts of heat applied to the capillary, and different shapes and/or cross-sectional areas will suit a given application.

The conversion device can be an external combustion engine, such as a Stirling engine, micro-turbine/generator or other suitable device for converting heat to mechanical or electrical power with an optional generator capable of producing up to about 5,000 watts of power. The liquid fuel can be any type of hydrocarbon fuel such as jet fuel, gasoline, kerosene or diesel oil, an oxygenate such as ethanol, methanol, methyl tertiary butyl ether, or blends of any of these and the fuel is preferably supplied to the flow passage at pressures of preferably less than 100 psig, more preferably less than 50 psig, even more preferably less than 10 psig, and most preferably less than 5 psig. The vaporized fuel can be mixed with air to form an aerosol having a mean droplet size of 25 µm or less, preferably 10 µm or less, thus allowing clean and efficient ignition capabilities.

According to one preferred form, the vaporized fuel can be mixed with air at ambient temperature, which is drawn into air supply passages leading into the combustion chamber. Alternatively, the vaporized fuel can be mixed with air that has been preheated such as by a heat exchanger that preheats the air with heat of exhaust gases removed from the combustion chamber. If desired, the air can be pressurized such as by a blower prior to mixing with the vaporized fuel.

As indicated, during vaporization of liquid fuel in a heated capillary passage, deposits of carbon and/or heavy hydrocarbons may accumulate on the capillary walls and flow of the fuel can be severely restricted which ultimately can lead to clogging of the capillary flow passage. The rate at which these deposits accumulate is a function of capillary wall temperature, the fuel flow rate and the fuel type. While fuel additives may be useful in reducing such deposits, should clogging develop, the hybrid fuel-vaporizing device may optionally provide means for cleaning deposits formed during operation.

The heated capillary flow passage of the hybrid fuel vaporization system has the ability to form an aerosol of small fuel droplets (e.g., 25 μm or less, preferably 10 μm or less) when the vaporized fuel mixes with air at ambient temperature, operating at liquid fuel pressures below 100 psig, preferably less than 50 psig, more preferably less than 10 psig, and even more preferably less than 5 psig. The hybrid fuel vaporization system possesses the ability to combust fuel at low air supply pressure (e.g., below 2 inch $H_2O$), starts rapidly, provides for control of fouling, clogging and gumming, operates at reduced levels of exhaust emissions and requires low ignition energy to ignite the fuel-air mixture.

One advantage provided by the hybrid fuel vaporization system of the apparatus for generating power is in its ignition energy requirement characteristics. Minimum ignition energy is a term used to describe the ease with which an atomized fuel/air mixture can be ignited, typically with an igniter such as a spark ignition source. The device according to the invention can provide vaporized fuel and/or aerosol with droplets having a Sauter Mean Diameter (SMD) of less than 25 μm, preferably less than 10 μm and more preferably less than 5 μm, such fine aerosols being useful to improve the start-up characteristics and flame stability in gas turbine applications. Additionally, very significant reductions in minimum ignition energy can be achieved for fuels having values of SMD at or below 25 μm. For example, as discussed in Lefebvre, Gas Turbine Combustion (Hemisphere Publishing Corporation, 1983) at page 252, $E_{min}$, a term that correlates the ease with which an atomized fuel/air mixture may be ignited, is shown to sharply decrease as SMD decreases. Minimum ignition energy is roughly proportional to the cube of the Sauter Mean Diameter (SMD) of the fuel droplets in the aerosol. SMD is the diameter of a droplet whose surface-to-volume ratio is equal to that of the entire spray and relates to the mass transfer characteristics of the spray. The relationship between $E_{min}$ and SMD for various fuels is shown in Lefebvre to be roughly approximated by the following relationship:

$$\log E_{min}=4.5(\log SMD)+k;$$

where $E_{min}$ is measured in mJoules,

SMD is measured in μm, and k is a constant related to fuel type.

According to Lefebvre, heavy fuel oil has a minimum ignition energy of about 800 mJ at a SMD of 115 μm and a minimum ignition energy of about 23 mJ at a SMD of 50 μm. Isooctane has a minimum ignition energy of about 9 mJ at a SMD of 90 μm and a minimum ignition energy of about 0.4 mJ at a SMD of 40 μm. For a diesel fuel, when SMD is equal to 100 μm, $E_{min}$ is about 100 mJ. A reduction in SMD to 30 μm would yield a reduction in $E_{min}$ to about 0.8 mJ. As may be appreciated, ignition system requirements are substantially reduced for SMD values below 25 μm.

The power conversion apparatus according to the present invention has been found to exhibit highly desirable low ignition energy requirements. A low ignition energy requirement improves the power producing benefits of the present invention by reducing the weight of the overall system and maximizing the power output through the reduction of the parasitic power losses associated with the ignition system.

In view of the benefits hereinabove described, low energy spark ignition devices are preferred for the igniter of the power producing apparatus. Preferred are small piezo-electric ignition devices capable of providing a spark energy in the range of about 5 to 7 millijoules (mJ). Such devices are known to be simple, compact and present no parasitic load issues. The ultra-fine fuel vaporization provided by the hybrid fuel vaporization system cooperates to provide excellent ignition characteristics with low energy piezo-electric ignition devices.

The emissions characteristics of liquid-fueled combustion devices are known to be sensitive to the quality of the fuel droplet size distribution. High quality, fine sprays promote fuel evaporation and enhance mixing, thereby reducing the need for fuel-rich combustion and the often-attendant generation of smoke and soot. Small droplets follow flow streamlines and are less prone to impact against burner walls. Conversely, large droplets can impact burner walls and cause increased CO and hydrocarbon emissions and carbon deposits. This problem is more noticeable in devices where the flames are highly confined.

The heat produced during combustion of the vaporized fuel can be converted to electrical or mechanical power. For instance, the heat could be converted to any desired amount of electrical or mechanical power, e.g., up to 5000 watts of electrical power or mechanical power. Compared to portable battery technology which can only provide approximately 20 W for a few hours or a noisy, high emissions, internal combustion engine/generator producing above 1 kW, the apparatus according to one preferred embodiment of the invention offers a quiet, clean power source in the few hundred watt range.

Various technologies exist for conversion of heat produced in the combustion chamber according to the invention into electrical or mechanical power. For instance, in the 20 to 5000 watt range, at least the following technologies are contemplated: external combustion engines, such as a Stirling engine, for conversion of heat into mechanical power which can be used to drive a generator, micro-gas turbines which can be used to drive a generator, thermoelectric for direct conversion of heat into electricity, and thermophotovoltaics for direct conversion of radiant energy into electricity.

The thermoelectric devices offer advantages in terms of being quiet and durable, and coupled with external combustion systems, offer the potential for low emissions and flexibility as to fuel. Various types of thermoelectric generators, which can be used as the conversion device, include those disclosed in U.S. Pat. Nos. 5,563,368; 5,793,119; 5,917,144; and 6,172,427, the disclosures of which are hereby incorporated by reference.

The thermophotovoltaic devices offer advantages in terms of being quiet, providing moderate power density, and coupled with external combustion systems offer the potential for low emissions and flexibility as to fuel. Various types of thermophotovoltaic devices, which can be used as the conversion device, include those disclosed in U.S. Pat. Nos. 5,512,109; 5,753,050; 6,092,912; and 6,204,442, the disclosures of which are hereby incorporated by reference. As shown in U.S. Pat. No. 6,204,442, a heat radiating body can be used to absorb heat from combustion gases and heat radiated from the heat radiating body is directed to a photocell for conversion to electricity, thus protecting the photocell from direct exposure to the combustion gases.

Micro-gas turbines could be desirable in terms of high specific power. Microturbine devices, which can be used as the conversion device, include those disclosed in U.S. Pat. Nos. 5,836,150; 5,874,798; and 5,932,940, the disclosures of which are hereby incorporated by reference.

Stirling engines offer advantages with respect to size, quiet operation, durability, and coupled with external combustion systems offer the potential for low emissions and flexibility as to fuel. Stirling engines that can be used as the conversion device will be apparent to those skilled in the art.

Referring now to FIG. 1, a hybrid fuel-vaporizing device for use in a power-generating device is shown. Hybrid fuel vaporizing device 10, includes a capillary flow passage 12, having an inlet end 14 and an outlet end 16, outlet end 16. A fuel vaporizing member, which may be a fuel vaporizing chamber 130, as shown, is positioned so that a first surface 136 is exposed to a combustion chamber (not shown), while the fuel exiting outlet end 16 of capillary flow passage 12, which is in fluid communication with fuel vaporizing chamber 130, impinges on a second surface 134. When at or near operating temperature, the heat of combustion heats fuel vaporizing chamber 130, causing the fuel that impinges second surface 134 to vaporize.

Fuel vaporizing chamber 130 has at least one orifice 132 to supply the vaporized liquid fuel for combustion. Optionally, a control valve 18 may be provided for placing inlet end 14 of capillary flow passage 12 in fluid communication with a liquid fuel source F and introducing the liquid fuel in a substantially liquid state into capillary flow passage 12. The control valve 18 may be operated by a solenoid (not shown). A heat source 20 is arranged along capillary flow passage 12.

As is particularly preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. During apparatus start-up, or as may be desired, heat source 20 is operable to heat the liquid fuel in capillary flow passage 12 to a level sufficient to change at least a portion thereof from the liquid state to a vapor state and deliver a stream of substantially vaporized fuel from outlet end 16 of capillary flow passage 12 and into vaporizing chamber 130. By substantially vaporized is meant that at least 50% of the liquid fuel is vaporized; preferably at least 70%, and more preferably at least 80% of the liquid fuel is vaporized.

Fuel vaporizing device 10 may optionally include means for cleaning deposits formed during operation. The means for cleaning deposits shown in FIG. 1 includes control valve 18, which can be a three-way valve for alternatively placing capillary flow passage 12 in fluid communication with either a source of liquid fuel F or a source of oxidizer C and heat source 20. In operation, heat source 20 is used to heat the oxidizer C in capillary flow passage 12 to a level sufficient to oxidize deposits formed during the heating of the liquid fuel F. In one embodiment, to switch from a fueling mode to a cleaning mode, the oxidizer control valve 26 is operable to alternate between the introduction of liquid fuel F and the introduction of oxidizer C into capillary flow passage 12 and enables the in-situ cleaning of capillary flow passage when the oxidizer is introduced into the capillary flow passage.

One technique for oxidizing deposits includes passing air or steam through the capillary flow passage. As indicated, the capillary flow passage is preferably heated during the cleaning operation so that the oxidation process is initiated and nurtured until the deposits are consumed. To enhance this cleaning operation, a catalytic substance may be employed, either as a coating on, or as a component of, the capillary wall to reduce the temperature and/or time required for accomplishing the cleaning. For continuous operation of the fuel-vaporizing device, more than one capillary flow passage 12 can be used such that when a clogged condition is detected, such as by the use of a sensor, fuel flow can be diverted to another capillary flow passage 12 and oxidant flow C initiated through the clogged capillary flow passage to be cleaned. As an example, a valving arrangement can be provided to selectively supply liquid fuel or air to each flow passage.

Alternatively, fuel flow can be diverted from a capillary flow passage and oxidant flow initiated at preset intervals. Fuel delivery to a capillary flow passage can be effected by a controller. For example, the controller can activate fuel delivery for a preset time period and deactivate fuel delivery after the preset amount of time. The controller may also effect adjustment of the pressure of the liquid fuel and/or the amount of heat supplied to the capillary flow passage based on one or more sensed conditions. The sensed conditions may include inter alia: the fuel pressure, the capillary temperature or the air-fuel ratio. The controller may also control one or more capillary flow passages to clean deposits.

The cleaning technique may also be applied to combustion devices having a plurality of single capillary flow passage hybrid fuel vaporization devices. The time period between cleanings may either be fixed based upon experimentally determined clogging characteristics, or a sensing and control device may be employed to detect clogging and initiate the cleaning process as required. For example, a control device could detect the degree of clogging by sensing the fuel supply pressure to the capillary flow passage of the hybrid fuel vaporization device.

Figure 2:
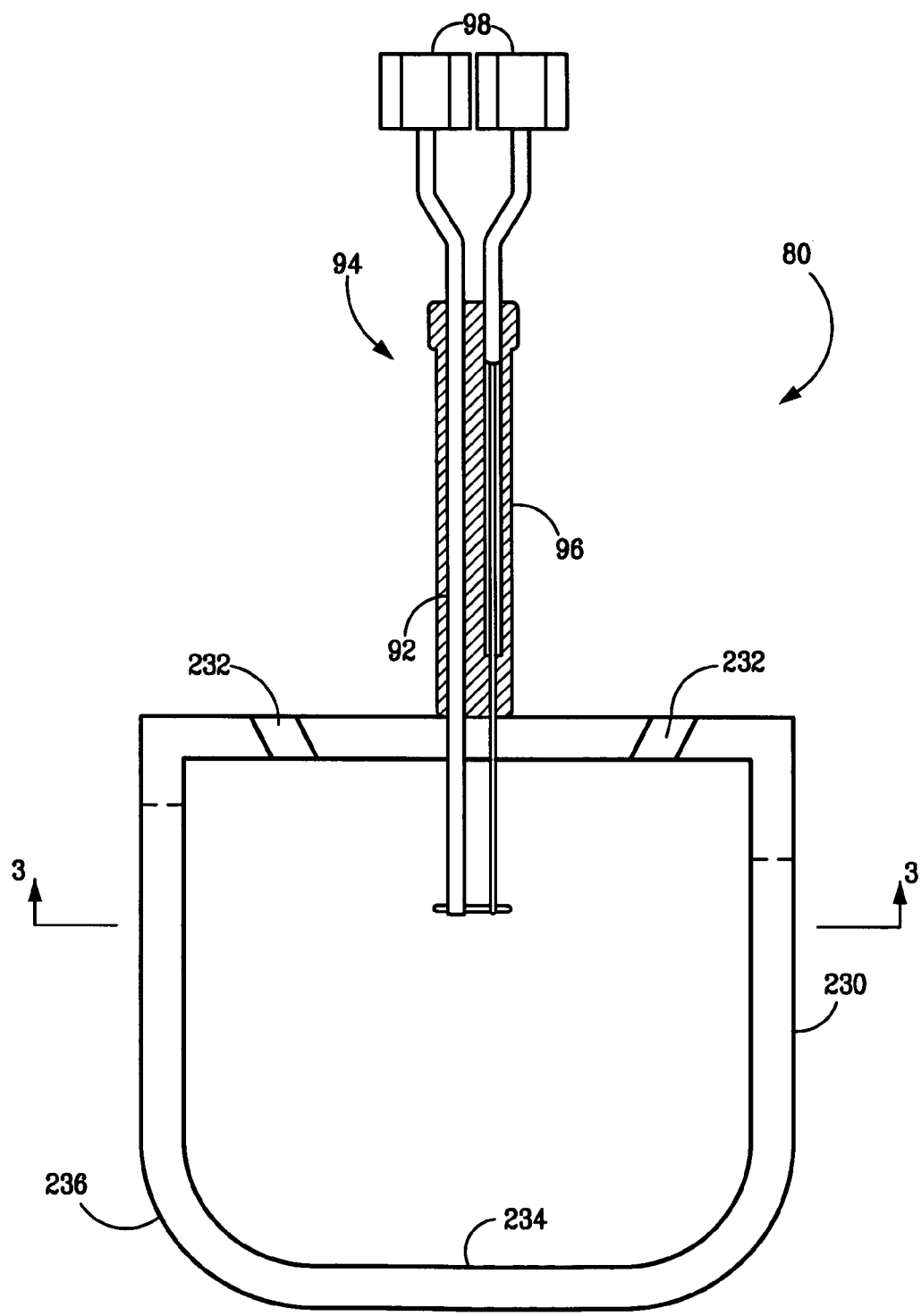
Figure 3:
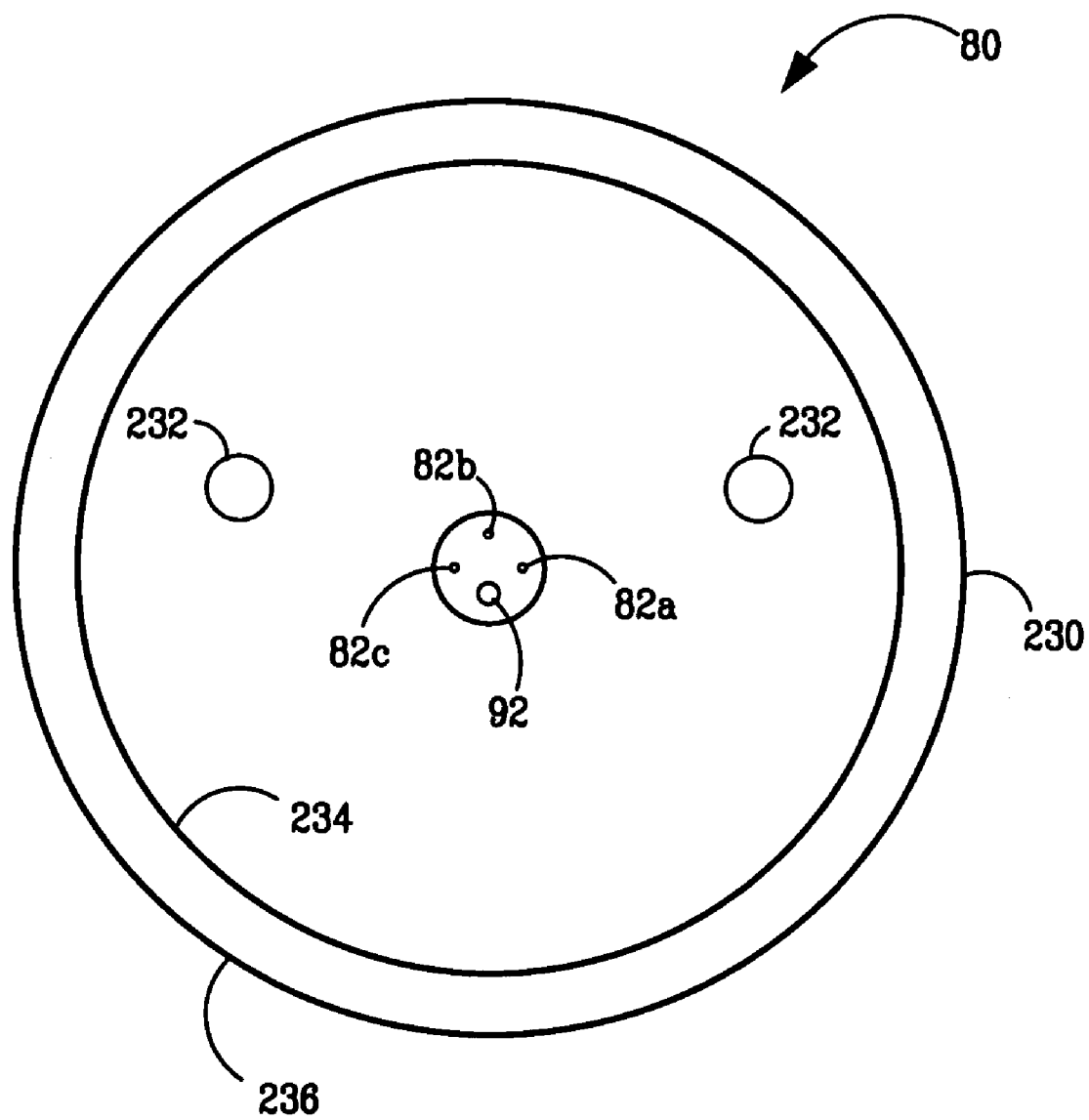

As indicated, the oxidation cleaning technique may also be applied to a single hybrid fuel-vaporizing device that is required to operate continuously. In this case, multiple capillary flow passages are employed. An exemplary hybrid multiple capillary flow passage fuel-vaporizing device 80 is illustrated in FIGS. 2 and 3. FIG. 2 presents a schematic view of a hybrid fuel vaporizer 80 employing a multiple capillary tube arrangement, integrated into a single capillary assembly 94, each capillary tube having an inlet end and an outlet end. A fuel vaporizing member, which again may be a fuel vaporizing chamber 230, is positioned so that a first surface 236 is exposed to a combustion chamber (not shown), while the fuel exiting the outlet end of capillary flow passage, which is in fluid communication with fuel vaporizing chamber 230, impinges on a second surface 234. When at or near operating temperature, the heat of combustion heats fuel vaporizing chamber 230, causing the fuel that impinges second surface 234 to vaporize.

Vaporizing chamber 230 has at least one orifice 232 for delivering a substantially vaporized stream of fuel for combustion. Consistent with FIG. 2, a plurality of orifices 232 are preferred. FIG. 3 presents an end view taken along line 3—3 of FIG. 2. As shown, the assembly may include three capillary tubes 82A, 82B, 82C and a positive electrode 92 which can include a solid stainless steel rod. The tubes and the rod can be supported in a body 96 of electrically insulating material and power can be supplied to the rod and capillary tubes via fittings 98. For example, direct current can be supplied to upstream ends of one or more of the capillary tubes and a connection 95 at the downstream ends thereof can form a return path for the current through rod 92.

Figure 4:
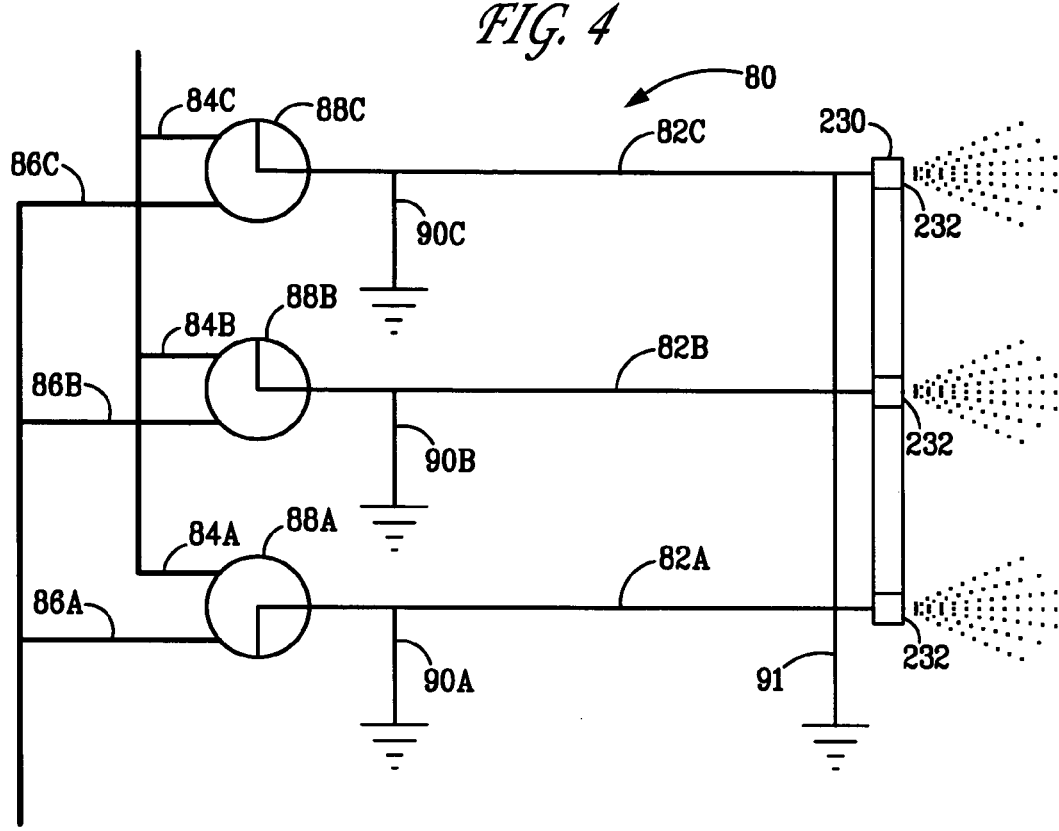
FIG. 4 shows details of a device that can be used to vaporize fuel and oxidize deposits in a hybrid fuel-vaporizing device having a multi-capillary arrangement and a vaporizing chamber to deliver substantially vaporized fuel for use in the practice of the present invention.

Reference is made now to FIG. 4, wherein a hybrid multiple capillary tube vaporizing system 80 is shown. The system includes capillary tubes 82A through 82C, which are each in fluid communication with vaporizing chamber 230, fuel supply lines 84A through 84C, oxidizer supply lines 86A through C, control valves 88A through 88C, power input lines 90A–90C and common ground 91. The system 80 allows cleaning of one or more capillary tubes while fuel delivery continues with one or more other capillary tubes. For example, combustion of fuel supplied via capillary flow passages 82B and 82C can be carried out during cleaning of capillary flow passage 82A. Cleaning of capillary flow passage 82A can be accomplished by shutting off the supply of fuel to capillary tube 82A, supplying air to capillary flow passage 82A with sufficient heating to oxidize deposits in the capillary flow passage. Thus, the cleaning of one or several capillaries can be carried out while continuously delivering fuel. The one or more capillary flow passages being cleaned are preferably heated during the cleaning process by an electrical resistance heater or thermal feedback from the application. Again, the time period between cleanings for any given capillary flow passage may either be fixed based upon known clogging characteristics, determined experimentally, or a sensing and control system may be employed to detect deposit buildup and initiate the cleaning process as required.

Figure 5:
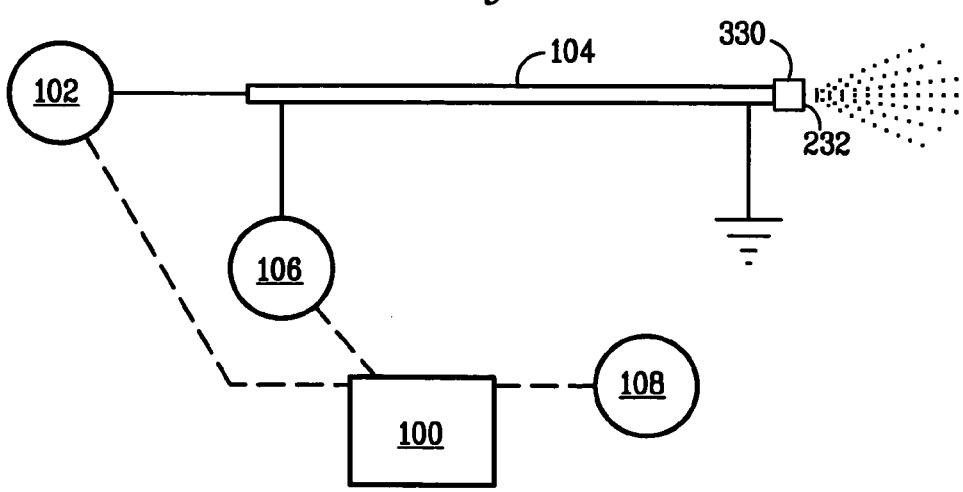
FIG. 5 shows a schematic of a control device to deliver fuel and optionally oxidizing gas to a hybrid fuel-vaporizing device having a capillary flow passage and a vaporizing chamber.

FIG. 5 shows an exemplary schematic of a control system to operate an apparatus in accordance with the present invention, the apparatus incorporating an oxidizing gas supply for cleaning clogged capillary passages. The control system includes a controller 100 operably connected to a fuel supply 102 that supplies fuel and optionally air to a flow passage such as a capillary flow passage 104, which is in fluid communication with vaporizing chamber 330. Vaporizing chamber 330 possesses at least one orifice 332 for the delivery of substantially vaporized fuel. The controller is also operably connected to a power supply 106 that delivers power to a resistance heater or directly to a metal capillary flow passage 104 for heating the tube sufficiently to vaporize the fuel. If desired, the combustion system can include multiple flow passages and heaters operably connected to the controller 100. The controller 100 can be operably connected to one or more signal sending devices such as an on-off switch, thermocouple, fuel flow rate sensor, air flow rate sensor, power output sensor, battery charge sensor, etc. whereby the controller 100 can be programmed to automatically control operation of the combustion system in response to the signal(s) outputted to the controller by the signal sending devices 108.

Referring again to FIG. 1, in operation, the hybrid fuel vaporizing device of the apparatus is positioned within a combustion chamber so that the heat produced by combustion heats vaporizing chamber 130 such that, after warm-up and the reduction or discontinuance of capillary passage heating, the warmed or unheated liquid fuel is heated sufficiently to substantially vaporize the liquid fuel as it passes through the vaporizing chamber orifices 132, reducing or eliminating the need to electrically heat the capillary flow passage 12.

As will be appreciated, the fuel vaporizing device and attendant system depicted in FIGS. 1 through 5 may also be used in connection with another embodiment of the present invention. Referring again to FIG. 1, the means for cleaning deposits includes control valve 18, which may again be a three-way valve, for placing capillary flow passage 12 alternatively in fluid communication with a solvent or a source of liquid fuel, enabling the in-situ cleaning of capillary flow passage 12 when the solvent is introduced into capillary flow passage 12. While a wide variety of solvents have utility, the solvent may comprise liquid fuel from the liquid fuel source. When this is the case, no control valve may be required, as there is no need to alternate between fuel and solvent, and the heat source should be phased-out or deactivated during the cleaning of capillary flow passage 12.

Figure 6:
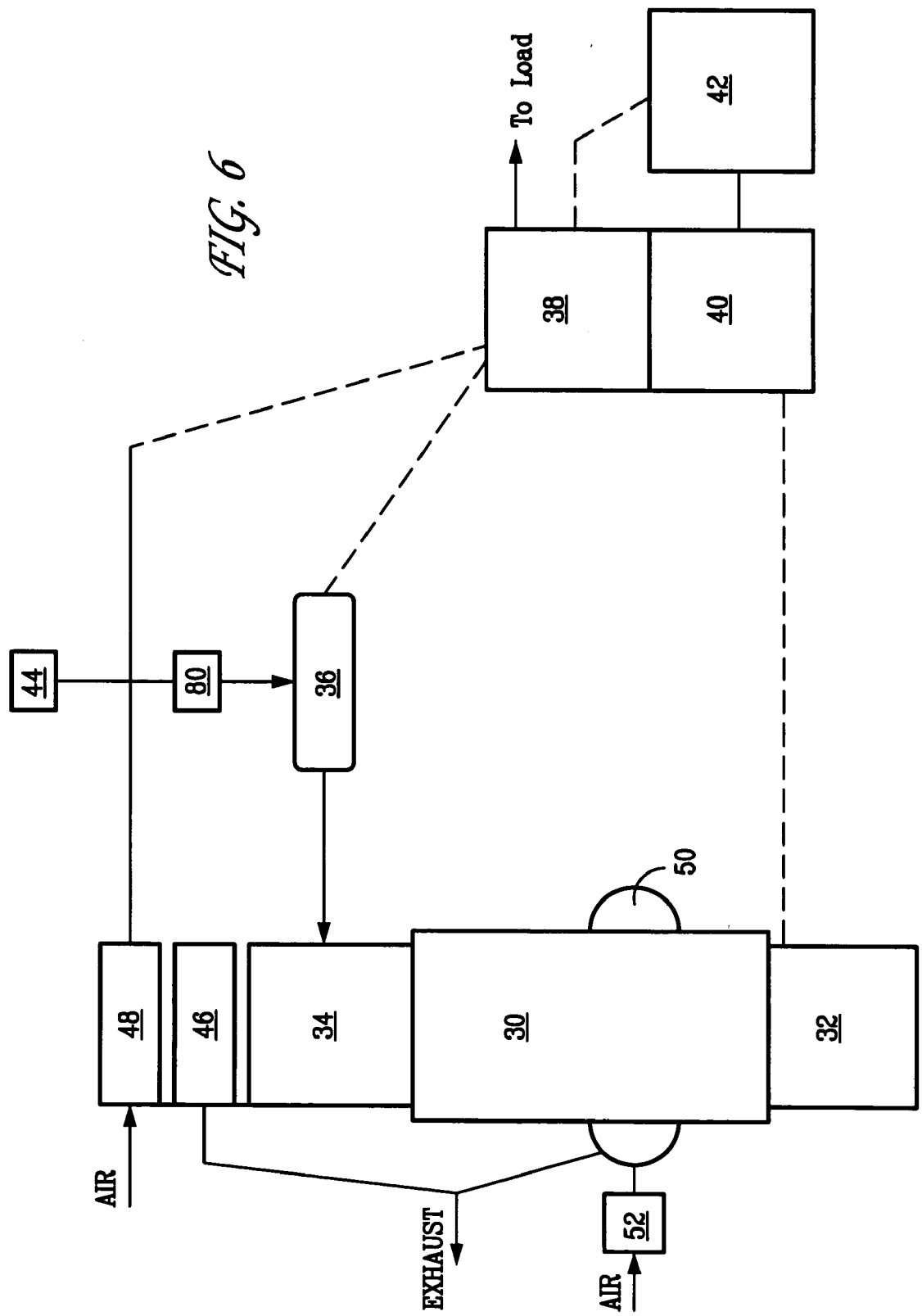
FIG. 6 is a schematic view of an apparatus for generating power in accordance with the invention wherein an external combustion engine, such as a Stirling engine, is used to generate electricity in accordance with one embodiment of the invention.

FIG. 6 shows a schematic of an apparatus in accordance with the invention which includes a free-piston Stirling engine 30, a combustion chamber 34 wherein heat at 550–750° C. is converted into mechanical power by a reciprocating piston which drives an alternator 32 to produce electrical power. The assembly also includes a hybrid fuel vaporizer 80, a heater assembly 36, a controller 38, a rectifier/regulator 40, a battery 42, a fuel supply 44, a recuperator 46, a combustion blower 48, a cooler 50, and a cooler/blower 52. In operation, the controller 38 is operable to control delivery of fuel to the hybrid fuel vaporizer 80 and to control combustion of the fuel in the chamber 34 such that the heat of combustion drives a piston in the Stirling engine such that the engine outputs electricity from the alternator 32. If desired, the Stirling engine/alternator can be replaced with a kinematic Stirling engine which outputs mechanical power. Examples of combustion chambers and air preheating arrangements can be found in U.S. Pat. Nos. 4,277,942, 4,352,269, 4,384,457 and 4,392,350, the disclosures of which are hereby incorporated by reference.

Figure 7:
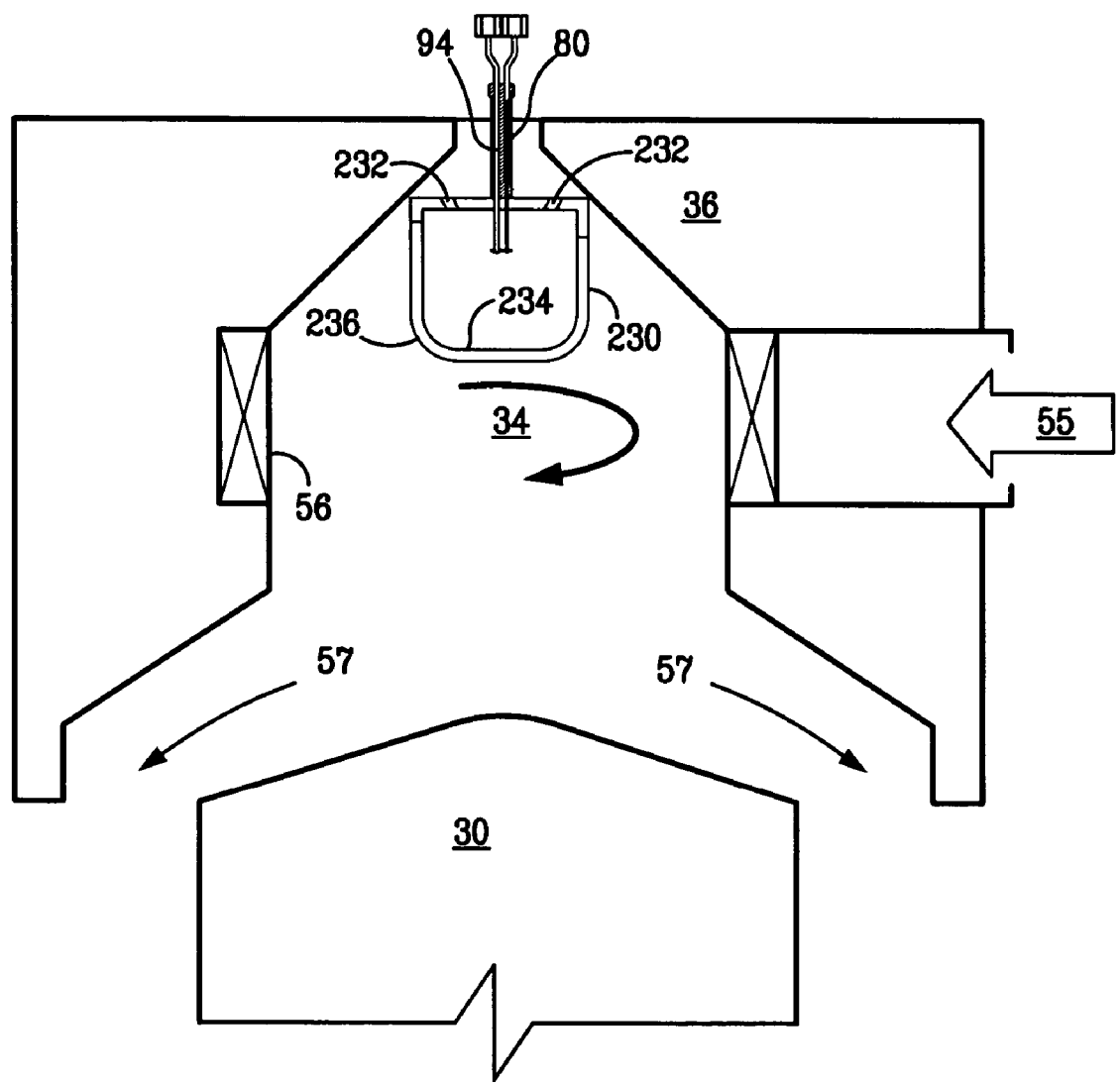
FIG. 7 shows a partial cross-sectional schematic view of a power-producing device in accordance with another embodiment of the invention.

FIG. 7 presents a partial cross-sectional schematic view of a power-producing device in accordance with another embodiment of the invention, which can form part of a heat conversion device such as a Stirling engine assembly. As shown in FIG. 7, air delivered to an air inlet by an air blower enters the combustion chamber 34 and mixes with vaporized fuel delivered to the chamber by the hybrid fuel vaporizer 80. Heat of combustion in the chamber 34 heats the end of the Stirling engine 30 and a sliding piston reciprocates within an alternator in a manner that generates electricity. The chamber 34 can be designed to allow the exhaust gases to preheat incoming air and thus lower the energy requirements for combusting the fuel. For instance, the housing can include a multiwall arrangement, which allows the incoming air to circulate in a plenum, which is heated by exhaust gases circulating in an exhaust passage. Inlet air (indicated by arrow 55) can be caused to swirl in the combustion chamber by passing the air through swirler vanes 56 around the combustion chamber 34. The combusted air-fuel mixture heats the heat conversion device (Stirling engine) 30 and exhaust gases (indicated by arrows 57) are removed from the combustion chamber.

Figure 8:
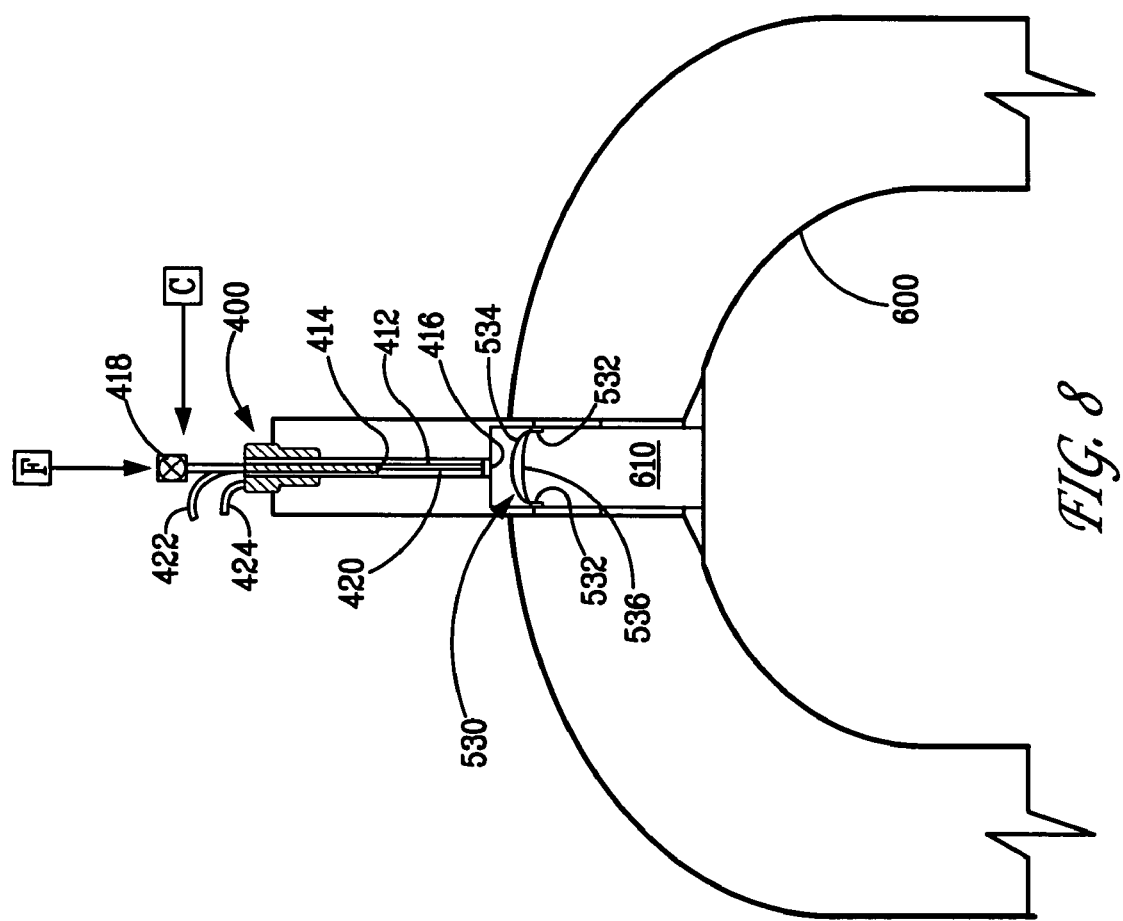
FIG. 8 shows a partial cross-sectional schematic view of yet another power-producing device in accordance with another embodiment of the invention.

In FIG. 8, another embodiment of a hybrid fuel vaporizer is shown as part of a heat conversion device, which may be an external combustion engine assembly, such as a Stirling engine. The hybrid fuel vaporizer and heat conversion device is schematically shown in partial cross-section. Hybrid fuel vaporizing device 400, includes a capillary flow passage 412, having an inlet end 414 and an outlet end 416, outlet end 416 positioned proximate to fuel-vaporizing member 530. Fuel vaporizing member 530 is advantageously configured to have a relatively large surface area to aid in the transfer of the heat of combustion from combustion chamber 600. As shown, fuel vaporizing member 530 is positioned so that a first surface 536 is exposed to combustion chamber 600, while the fuel exiting outlet end 416 of capillary flow passage 412 impinges on a second surface 534. When the heat conversion device is at or near operating temperature, the heat of combustion heats fuel vaporizing member 530, causing the fuel that impinges second surface 534 to vaporize.

Fuel vaporizing member 530 has an outer periphery 532, which when positioned within passage 610, forms a peripheral gap 532. As may be appreciated, when passage 610 and fuel vaporizing member 530 are both circular in cross-section, peripheral gap 532 will be an annular gap. Vaporized fuel exiting peripheral gap 532 flows through passage 610 for subsequent combustion. Optionally, a control valve 418 may be provided for placing inlet end 414 of capillary flow passage 412 in fluid communication with a liquid fuel source F and introducing the liquid fuel in a substantially liquid state into capillary flow passage 412. The control valve 418 may be operated by a solenoid (not shown).

A heat source 420 is arranged along capillary flow passage 412. As is particularly preferred, heat source 420 is provided by forming capillary flow passage 412 from a tube of electrically resistive material, a portion of capillary flow passage 412 forming a heater element when a source of electrical current is connected to the tube at connections 422 and 424 for delivering current therethrough. During apparatus start-up, or as may be desired, heat source 420 is operable to heat the liquid fuel in capillary flow passage 412 to a level sufficient to change at least a portion thereof from the liquid state to a vapor state and deliver a stream of substantially vaporized fuel from outlet end 416 of capillary flow passage 412.

As with the previously described embodiments, fuel vaporizing device 400 may optionally include means for cleaning deposits formed during operation. The means for cleaning deposits shown in FIG. 8 includes control valve 418, which can be a three-way valve for alternatively placing capillary flow passage 412 in fluid communication with either a source of liquid fuel F or a source of oxidizer C and heat source 420. In operation, heat source 420 is used to heat the oxidizer C in capillary flow passage 412 to a level sufficient to oxidize deposits formed during the heating of the liquid fuel F. In one embodiment, to switch from a fueling mode to a cleaning mode, the oxidizer control valve 418 is operable to alternate between the introduction of liquid fuel F and the introduction of oxidizer C into capillary flow passage 12 and enables the in-situ cleaning of capillary flow passage 412 when the oxidizer is introduced into the capillary flow passage 412.

Air or steam may be passed through the capillary flow passage 412. The capillary flow passage 412 is preferably heated during the cleaning operation so that the oxidation process is initiated and nurtured until the deposits are consumed. To enhance this cleaning operation, a catalytic substance may be employed, either as a coating on, or as a component of, the capillary wall to reduce the temperature and/or time required for accomplishing the cleaning. For continuous operation of the fuel-vaporizing device, more than one capillary flow passage 412 can be used such that when a clogged condition is detected, such as by the use of a sensor, fuel flow can be diverted to another capillary flow passage 412 and oxidant flow C initiated through the clogged capillary flow passage to be cleaned, with valving employed to selectively supply liquid fuel or air to each flow passage.

The cleaning technique may also be applied to combustion devices having a plurality of single capillary flow passage hybrid fuel vaporization devices 400. The time period between cleanings may either be fixed based upon experimentally determined clogging characteristics, or a sensing and control device may be employed to detect clogging and initiate the cleaning process as required. For example, a control device could detect the degree of clogging by sensing the fuel supply pressure to the capillary flow passage of the hybrid fuel vaporization device 400.

Referring particularly to the heat conversion device of FIG. 8, combustion air may be delivered to an air inlet by an air blower and enters the combustion chamber 600 for mixing with vaporized fuel delivered to combustion chamber 600 by hybrid fuel vaporizer 400. As with the embodiment of FIG. 7, the heat of combustion in combustion chamber 600 heats the end of the external combustion engine, such as a Stirling engine, and a sliding piston reciprocates within an alternator in a manner that generates electricity. The chamber 600 can be designed to allow the exhaust gases to preheat incoming air and thus lower the energy requirements for combusting the fuel. For instance, the housing can include a multiwall arrangement, which allows the incoming air to circulate in a plenum, which is heated by exhaust gases circulating in an exhaust passage. Inlet air can be caused to swirl in combustion chamber 600 by passing the air through swirler vanes (not shown) around combustion chamber 600. The combusted air-fuel mixture heats the heat conversion device (an external combustion engine, such as a Stirling engine) and exhaust gases are removed from the combustion chamber.

As may be appreciated, two hybrid fuel vaporizers may be used together in the same combustion chamber of a power generating apparatus, one supplying the fuel for combustion, while the other one is purged of deposits through oxidation or solvent cleaning, as discussed above.

In general, the power conversion apparatus could include a liquid fuel source, at least one hybrid fuel vaporizer having one or more heated capillary tubes through which fuel from the fuel supply is vaporized and delivered to a combustion chamber wherein the vaporized fuel is combusted, and heat produced in the combustion chamber is used to drive an external combustion engine, such as a Stirling engine, or other heat conversion device. A heat exchanger can be used to preheat air as the air travels through air passages in the heat exchanger thereby maximizing efficiency of the device, i.e., by preheating the air mixed with the vaporized fuel to support combustion in the chamber, less fuel is needed to maintain the external combustion engine at a desired operating temperature. The exhaust gas can travel through exhaust ducts in the heat exchanger whereby heat from the exhaust gas can be transferred to the air being delivered to the combustion chamber.

The combustion chamber can incorporate any suitable arrangement wherein air is mixed with the vaporized fuel and/or an air-fuel mixture is combusted. For example, the fuel can be mixed with air in a venturi to provide an air-fuel mixture and the air-fuel mixture can be combusted in a heat-generating zone downstream from the venturi. In order to initiate combustion, the air-fuel mixture can be confined in an ignition zone in which an igniter such as a spark generator ignites the mixture. The igniter can be any device capable of igniting the fuel such as a mechanical spark generator, an electrical spark generator, resistance heated ignition wire or the like. The electrical spark generator can be powered by any suitable power source, such as a small battery. However, the battery can be replaced with a manually operated piezoelectric transducer that generates an electric current when activated. With such an arrangement, current can be generated electro-mechanically due to compression of the transducer. For instance, a striker can be arranged so as to strike the transducer with a predetermined force when the trigger is depressed. The electricity generated by the transducer can be supplied to a spark generating mechanism by suitable circuitry. Such an arrangement could be used to ignite the fuel-air mixture.

Some of the electrical power generated by the conversion device can be stored in a suitable storage device such as a battery or capacitor, which can be used to power the igniter. For example, a manually operated switch can be used to deliver electrical current to a resistance-heating element or directly through a portion of a metal tube, which vaporizes fuel in the flow passage and/or the electrical current can be supplied to an igniter for initiating combustion of the fuel-air mixture delivered to the combustion chamber.

If desired, the heat generated by combusting the fuel could be used to operate any types of devices that rely on mechanical or electrical power. For instance, a heat conversion source could be used to generate electricity for portable electrical equipment such as telephone communication devices (e.g., wireless phones), portable computers, power tools, appliances, camping equipment, military equipment, transportation equipment such as mopeds, powered wheelchairs and marine propulsion devices, electronic sensing devices, electronic monitoring equipment, battery chargers, lighting equipment, heating equipment, etc. The heat conversion device could also be used to supply power to non-portable devices or to locations where access to an electrical power grid is not available, inconvenient or unreliable. Such locations and/or non-portable devices include remote living quarters and military encampments, vending machines, marine equipment, etc.

EXAMPLES

Example 1

Figure 9:
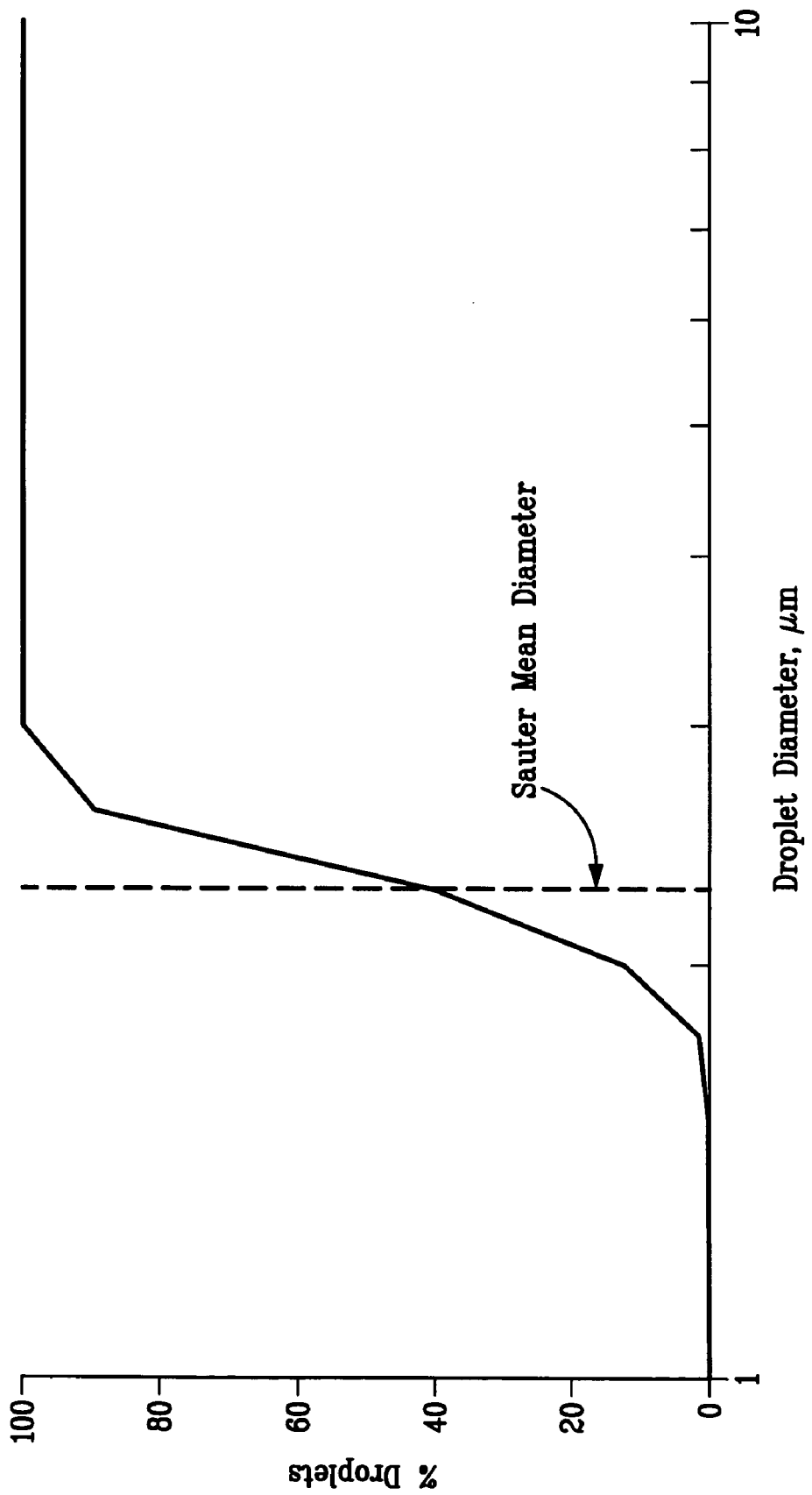
FIG. 9 is a droplet distribution graph showing percentage of droplets as a function of droplet diameter demonstrating the benefits of the fuel vaporizing devices employing capillary flow passages.

To demonstrate the potential benefit of enhanced fuel preparation, tests were performed wherein JP 8 jet fuel was vaporized by supplying the fuel to a heated capillary flow passage at constant pressure with a micro-diaphragm pump system. In these tests, a capillary tube of 0.010 ID/0.018 OD was used. The tube was constructed of 304 stainless steel having a length 3 inches. Heat for vaporizing the liquid fuel was generated by passing electrical current through a portion of the metal tube. The droplet size distribution was measured using a Spray-Tech laser diffraction system manufactured by Malvern. FIG. 9 presents the results of these tests. As shown, results of this test revealed droplets having a Sauter Mean Diameter (SMD) of between 1.7 and 3.0 μm. SMD is the diameter of a droplet whose surface-to-volume ratio is equal to that of the entire spray and relates to the spray's mass transfer characteristics.

The apparatus according to the present invention also produced measurable single and bimodal spray distributions. Measurements revealed a single mode SMD of 2.3 μm and bimodal SMD of 2.8 μm, the single mode providing aerosol droplet sizes of mostly between 1.7 and 4.0 μm whereas the bimodal spray distribution provided 80% or more of the aerosol droplets in the range of 1.7 to 4.0 μm with the remainder of droplet sizes in the range of 95 to 300 μm.

Example 2

A test to compare the clogging characteristics and benefits of the hybrid fuel vaporization system was conducted to those of the heated capillary passage of Example 1 was conducted. A hybrid fuel vaporizer of the type depicted in FIG. 1 was run continuously with fuel supply pressures ranging between 6 to 7 psig and with the vaporizer section placed over an open flame. Minimal electrical input, (7 W), was supplied to the capillary flow passage during this test to assist in preheating the fuel. The vaporizing chamber employed was 0.25" in diameter and 0.375" in length and was constructed of 304 stainless steel. The exit orifice of the vaporizing chamber was 0.02" in diameter.

For comparison, a capillary flow passage consisting of a 304 stainless steel capillary tube of 0.010 ID/0.018 OD and having a length 3 inches was used. A cyclic clogging/declogging test mode of 5 minutes fuel vaporization and 5 minutes low-pressure airflow for oxidative cleaning was employed, at a fuel supply pressure of roughly 19.5 psig.

Figure 10:
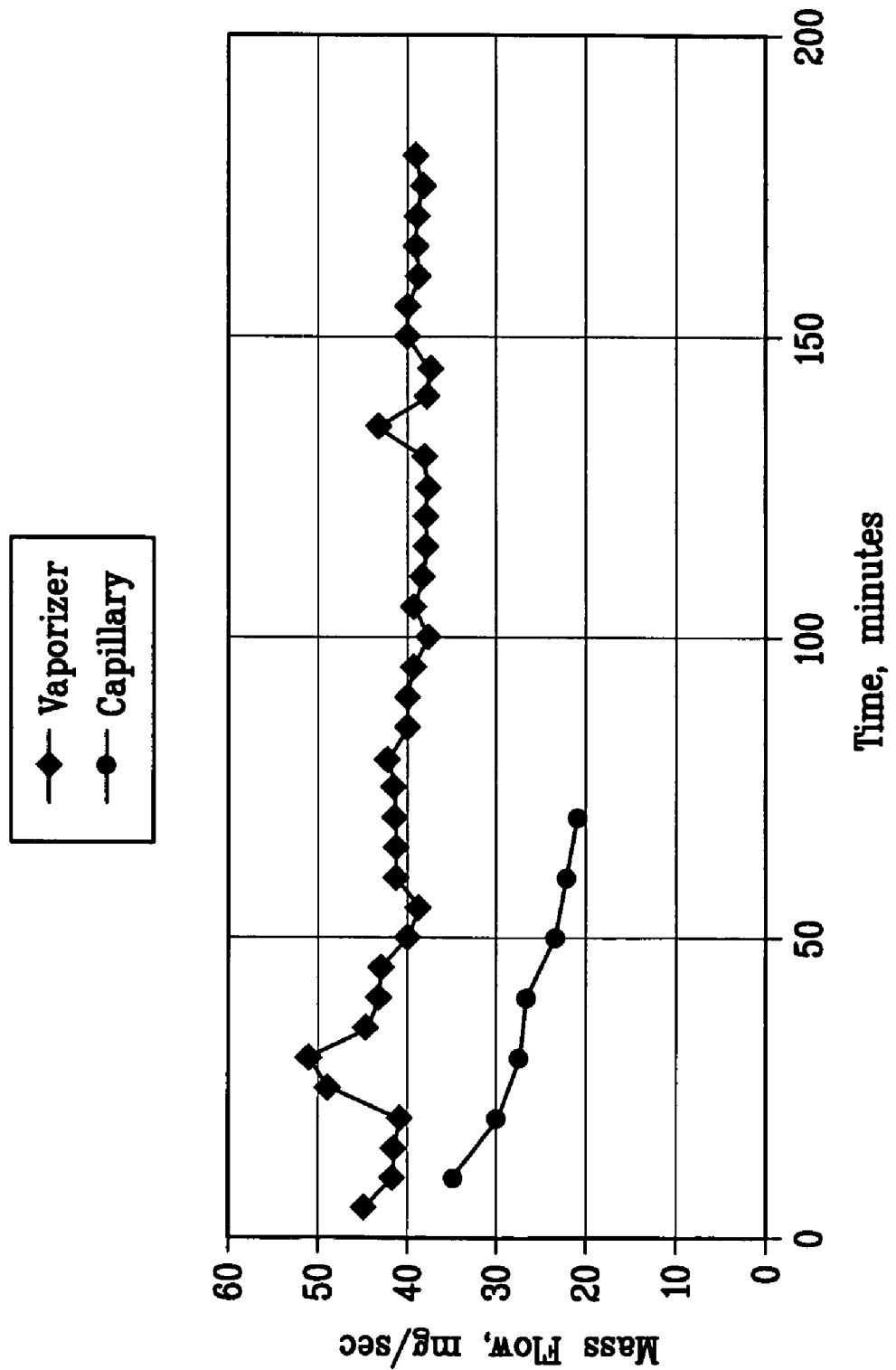
FIG. 10 compares results of cyclic clogging/de-clogging tests demonstrating the benefit to long-term operability of a hybrid fuel vaporization system.

Results of these tests are presented in FIG. 10, wherein the clear benefit to long-term operability is demonstrated for the hybrid fuel vaporization system disclosed herein.

While the invention has been described in detail with reference to preferred embodiments thereof, it will be apparent to one skilled in the art that various changes can be made, and equivalents employed, without departing from the scope of the invention.

What is claimed is:

1. A hybrid fuel vaporizing system for use in an apparatus for combusting fuel from a source of liquid fuel, comprising:
   (a) at least one capillary flow passage, said at least one capillary flow passage positioned so as to not be directly exposed to combustion gases and having an inlet end and an outlet end, said inlet end in fluid communication with the source of liquid fuel;
   (b) a heat source arranged along said at least one capillary flow passage, said heat source operable to electrically heat the liquid fuel in said at least one capillary flow passage to a level sufficient to change at least a portion thereof from a liquid state to a vapor state; and
   (c) a vaporizing member positioned downstream of said at least one capillary flow passage having a first surface and a second surface, said first surface exposed to heat produced by the apparatus for combusting fuel, said vaporizing member positioned so that fuel exiting said outlet end of said at least one capillary flow passage impinges on said second surface
   whereby a stream of substantially vaporized fuel is delivered for combustion.

2. The fuel system of claim 1, wherein said heat source comprises a resistance-heating element.

3. The fuel system of claim 1, further comprising a control valve which controls the flow of liquid fuel from the liquid fuel source.

4. The fuel system of claim 3, wherein said at least one capillary flow passage comprises at least one capillary tube.

5. The fuel system of claim 4, wherein said heat source comprises a section of said capillary tube heated by passing an electrical current therethrough.

6. The fuel system of claim 5, further comprising means for cleaning deposits formed during operation of the fuel system.

7. The fuel system of claim 3, further comprising means for cleaning deposits formed during operation of the fuel system.

8. The fuel system of claim 7, wherein said means for cleaning deposits includes said control valve end said heat source, said control valve operable to place said at least one capillary flow passage in fluid communication with an oxidizer, said heat source also being operable to heat the oxidizer in said at least one capillary flow passage to a level sufficient to oxidize deposits formed during the heating of the liquid fuel, wherein said control valve is operable to alternate between the introduction of liquid fuel and the introduction of oxidizer into said capillary flow passage and enables in-situ cleaning of said capillary flow passage when the oxidizer is introduced into said at least one capillary flow passage.

9. The fuel system of claim 8, wherein said at least one capillary flow passage comprises a plurality of capillary flow passages, each of said capillary flow passages being in fluid communication with a supply of fuel and a supply of oxidizing gas.

10. The fuel system of claim 8, wherein the oxidizer comprises air, exhaust gas, steam and mixtures thereof.

11. The fuel system of claim 1, wherein the apparatus for combusting fuel from a source of liquid fuel includes a conversion device selected from the group consisting of a micro-turbine, a micro-turbine with electrical generator, an external combustion engine, an external combustion engine with electrical generator, a thermoelectric device and a thermophotovoltaic device.

12. The fuel system of claim 7, wherein said means for cleaning deposits includes said fluid control valve, said fluid control valve operable for placing said at least one capillary flow passage in fluid communication with a solvent, enabling in-situ cleaning of said capillary flow passage when the solvent is introduced into said at least one capillary flow passage.

13. The fuel system of claim 12, wherein the solvent comprises liquid fuel from the liquid fuel source and wherein the heat source is phased-out during cleaning of said capillary flow passage.

14. The fuel system of claim 1, further comprising a fuel source, said fuel source capable of delivering pressurized liquid fuel to said at least one capillary flow passage at a pressure of 100 psig or less.

15. The fuel system of claim 1, wherein an aerosol having a particle size distribution, a fraction of which is 25 μm or less is formed.

16. The fuel system of claim 1, wherein said vaporizing member comprises a vaporizing chamber, said vaporizing chamber positioned to be heated by combusted fuel such that the fuel in vaporizing chamber is vaporized.

17. The fuel system of claim 1, wherein the fuel source includes a positive displacement fuel pump for supplying the liquid fuel at a desired flow rate.

18. The fuel system of claim 1, wherein said vaporizing member comprises a vaporizing chamber in fluid communication with said outlet end of said at least one capillary flow passage, said vaporizing chamber having at least one exit orifice for delivering a stream of substantially vaporized fuel for combustion.

19. The fuel system of claim 1, wherein said fuel vaporizing member has an outer periphery positioned within a passage so as to form a peripheral gap.

20. The fuel system of claim 19, wherein the passage and said fuel vaporizing member are circular in cross-section and said peripheral gap is an annular gap.

21. An apparatus for producing power from a source of liquid fuel, comprising:
   (a) at least one capillary flow passage, said at least one capillary flow passage positioned so as to not be directly exposed to combustion oases and having an inlet end and an outlet end, said inlet end in fluid communication with the source of liquid fuel;
   (b) a heat source arranged along said at least one capillary flow passage, said heat source operable to electrically heat the liquid fuel in said at least one capillary flow passage to a level sufficient to change at least a portion thereof from a liquid state to a vapor state;
   (c) a vaporizing member positioned downstream of said at least one capillary flow passage having a first surface and a second surface, said first surface exposed to heat produced by combusting fuel, said vaporizing member positioned so that fuel exiting said outlet end of said at least one capillary flow passage impinges on said second surface to produce a stream of substantially vaporized fuel;
   (d) a combustion chamber for combusting the stream of substantially vaporized fuel and air, said combustion chamber in communication with said first surface of said vaporizing member; and (e) a conversion device operable to convert heat released by combustion in said combustion chamber into mechanical and/or electrical power.

22. The apparatus of claim 21, wherein said heat source comprises a resistance-heating element.

23. The apparatus of claim 21, further comprising a control valve which controls the flow of liquid fuel from the liquid fuel source.

24. The apparatus of claim 21, wherein said at least one capillary flow passage comprises at least one capillary tube.

25. The apparatus of claim 24, wherein said heat source comprises a section of said capillary tube heated by passing an electrical current therethrough.

26. The apparatus of claim 23, further comprising means for cleaning deposits formed during operation of the apparatus.

27. The apparatus of claim 26, wherein said means for cleaning deposits includes said control valve and said heat source, said control valve operable to place said at least one capillary flow passage in fluid communication with an oxidizer, said heat source also being operable to heat the oxidizer in said at least one capillary flow passage to a level sufficient to oxidize deposits formed during the heating of the liquid fuel, wherein said control valve is operable to alternate between the introduction of liquid fuel and the introduction of oxidizer into said capillary flow passage and enables in-situ cleaning of said capillary flow passage when the oxidizer is introduced into said at least one capillary flow passage.

28. The apparatus of claim 27, wherein said at least one capillary flow passage comprises a plurality of capillary flow passages, each of said capillary flow passages being in fluid communication with a supply of fuel and a supply of oxidizing gas.

29. The apparatus of claim 27, wherein the oxidizer comprises air, exhaust gas, steam and mixtures thereof.

30. The apparatus of claim 26, wherein said conversion device comprises a device selected from the group consisting of a micro-turbine, a micro-turbine with electrical generator, an external combustion engine, an external combustion engine with electrical generator, a thermoelectric device and a thermophotovoltaic device.

31. The apparatus of claim 26, wherein said means far cleaning deposits includes said control valve, said control valve operable for placing said at least one capillary flow passage in fluid communication with a solvent, enabling in-situ cleaning of said capillary flow passage when the solvent is introduced into said at least one capillary flow passage.

32. The apparatus of claim 31, wherein the solvent comprises liquid fuel from the liquid fuel source and wherein the heat source is phased-out during cleaning of said capillary flow passage.

33. The apparatus of claim 21, wherein said combustion chamber includes an igniter operable to ignite the vaporized fuel.

34. The apparatus of claim 33, wherein the fuel supplied to the combustion chamber is effective to reduce the ignition energy requirements of the igniter.

35. The apparatus of claim 21, wherein said conversion device comprises a device selected from the group consisting of a micro-turbine, a micro-turbine with electrical generator, an external combustion engine, an external combustion engine with electrical generator, a thermoelectric device and a thermophotovoltaic device.

36. The apparatus of claim 21, wherein said conversion device outputs up to 5000 watts of mechanical or electrical power.

37. The apparatus of claim 21, further comprising a fuel source, said fuel source capable of delivering pressurized liquid fuel to said at least one capillary flow passage at a pressure of 100 psig or less.

38. The apparatus of claim 21, wherein said vaporizing member comprises a vaporizing chamber, said vaporizing chamber having at least one orifice, wherein the stream of substantially vaporized fuel mixes with air upon exiting the at least one orifice of said vaporizing chamber to form an aerosol having a particle size distribution, a fraction of which is 25 µm or less.

39. The apparatus of claim 21, further comprising a heat exchanger which includes an exhaust duct through which a portion of the exhaust gases exhausted from said combustion chamber are circulated and an air passage through which air is circulated, said heat exchanger preheating the air in said air passage by transferring heat from the exhaust gases in said exhaust duct to the air.

40. The apparatus of claim 21, further comprising an air blower, said air blower supplying air under pressure to said combustion chamber to enable the pressurized air to mix with the vaporized fuel in a desired air-to-fuel ratio effective to combust the air-fuel mixture.

41. The apparatus of claim 21, wherein said vaporizing chamber is positioned to be heated by the combusted fuel such that the fuel in said vaporizing chamber is vaporized.

42. The apparatus of claim 21, wherein the fuel source includes a positive displacement fuel pump, said positive displacement fuel pump supplying the liquid fuel to the capillary flow passage at a desired flow rate.

43. The apparatus of claim 21, wherein said vaporizing member comprises a vaporizing chamber in fluid communication with said outlet end of said at least one capillary flow passage, said vaporizing chamber having at least one exit orifice for delivering a stream of substantially vaporized fuel for combustion.

44. The apparatus of claim 21, wherein said fuel vaporizing member has an outer periphery positioned within a passage so as to form a peripheral gap.

45. The apparatus of claim 44, wherein the passage and said fuel vaporizing member are circular in cross-section and said peripheral gap is an annular gap.

46. A method of generating power, comprising;

(a) supplying liquid fuel to at least one capillary flow passage, the at least one capillary flow passage positioned so as to not be directly exposed to combustion gases and so that fuel exiting the at least one capillary flow passage impinges on a vaporizing member having a first surface and a second surface;

(b) heating the fuel that impinges on the vaporizing member and causing a stream of substantially vaporized fuel to be formed;

(c) combusting the vaporized fuel in a combustion chamber; and (d) converting heat produced by combustion of the vaporized fuel in the combustion chamber into mechanical and/or electrical power using a conversion device, wherein the first surface of the vaporizing member is positioned proximate to the combustion chamber so that heat produced from combustion is effective to heat the fuel that impinges on the second surface of the vaporizing member and supply the stream of substantially vaporized fuel for combustion.

47. The method of claim 46, further comprising a resistive heat source, wherein the at least one capillary flow passage includes at least one capillary tube and the resistive heat source comprises a heating element or section of the capillary tube heated by passing an electrical current therethrough, the method further including flowing the liquid fuel through the capillary tube and vaporizing the liquid fuel by heating the tube.

48. The method of claim 46, wherein the combustion chamber includes an igniter arranged to ignite the vaporized fuel, the method including igniting the vaporized fuel with the igniter.

49. The method of claim 48, wherein the use of vaporized liquid fuel is effective to reduce the ignition energy requirements of the igniter.

50. The method of claim 46, wherein the conversion device comprises a device selected from the group consisting of a micro-turbine, a micro-turbine with electrical generator, an external combustion engine, an external combustion engine with electrical generator, a thermoelectric device and a thermophotovoltaic device.

51. The method of claim 46, wherein the conversion device outputs up to 5000 watts of mechanical or electrical power, the method including generating power at one or more points in a range of up to 5000 watts of power with the conversion device.

52. The method of claim 46, wherein the fuel supply delivers pressurized liquid fuel to the at least one capillary flow passage, the method including delivering pressurized hydrocarbon fuel, oxygenated fuel or mixtures thereof, at a pressure of 100 psig or less to the at least one capillary flow passage.

53. The method of claim 46, wherein the stream of vaporized fuel mixes with air and forms a precombustion aerosol in the combustion chamber prior to combustion, the method including forming the precombustion aerosol having a particle size distribution, a fraction of which is 25 μm or less prior to igniting the vaporized fuel.

54. The method of claim 46, further comprising preheating air in a heat exchanger which includes an exhaust duct through which exhaust gases removed from the combustion chamber are circulated and an air passage through which air is circulated, the heat exchanger preheating the air in the air passage by transferring heat from the exhaust gases in the exhaust duct to the air.

55. The method of claim 46, further comprising supplying air under pressure to the combustion chamber such that the pressurized air mixes with the vaporized fuel in a desired air-to-fuel ratio suitable for combustion of the air-fuel mixture.

56. The method of claim 47, wherein the electrical resistance heater is only used for an initial start-up period and the heat from the combusted fuel is used to vaporize the liquid fuel that impinges on the second surface of the vaporizing member thereafter.

57. The method of claim 46, further comprising cleaning periodically the at least one capillary flow passage.

58. The method of claim 57, wherein said periodic cleaning comprises (i) halting liquid fuel flow to the at least one capillary flow passage, (ii) supplying an oxidizer to the at least one capillary flow passage and (iii) heating the at least one capillary flow passage whereby deposits farmed in the at least one capillary flow passage are oxidized.

59. The method of claim 58, further comprising selectively supplying fuel and oxidizer to the at least one capillary flow passage, wherein the supply selection is achieved by a valve mechanism operated by a controller.

60. The method of claim 59, wherein the oxidizer is selected from pressurized air, exhaust gas, steam and mixtures thereof.

61. The method of claim 57, wherein said periodic cleaning comprises (i) halting said heating of the at least one capillary flow passage, and (ii) supplying a solvent to the at least one capillary flow passage, whereby deposits formed in the at least one capillary flow passage are removed.

62. The method of claim 61, wherein said periodic cleaning comprises (i) phasing-out said heating of the at least one capillary flow passage, and (ii) supplying a solvent to the at least one capillary flow passage, whereby deposits formed in the at least one capillary flow passage are removed.

63. The method of claim 61, wherein the solvent includes liquid fuel from the liquid fuel source.

64. The method of claim 63, wherein the conversion device comprises a device selected from the group consisting of a micro-turbine, a micro-turbine with electrical generator, an external combustion engine, an external combustion engine with electrical generator, a thermoelectric device and a thermophotovoltaic device.

65. The method of claim 64, wherein the conversion device outputs up to 5000 watts of mechanical or electrical power.

66. The method of claim 46, wherein the vaporizing member includes a vaporizing chamber in fluid communication with the at least one capillary flow passage, the vaporizing chamber having at least one exit orifice for delivering a stream of substantially vaporized fuel for combustion.

67. The method of claim 66, wherein a plurality of capillary passages are in fluid communication with the vaporizing chamber.

68. The method of claim 46, wherein said fuel vaporizing member has an outer periphery positioned within a passage so as to form a peripheral gap.

69. The method of claim 68, wherein the passage and said fuel vaporizing member are circular in cross-section and said peripheral gap is an annular gap.

70. The method of claim 68, wherein a plurality of capillary passages are provided.

* * * * *